United States Patent

[11] 3,630,839

[72] Inventor Leaman B. Podolsky, Wilmington, Del.
[21] Appl. No. 779,075
[22] Filed Nov. 26, 1968
[45] Patented Dec. 28, 1971
[73] Assignee Westinghouse Electric Corporation, Pittsburgh, Pa.

[54] SYSTEM AND METHOD FOR OPERATING A BOILING WATER REACTOR-STEAM TURBINE PLANT
11 Claims, 3 Drawing Figs.

[52] U.S. Cl. .................................... 176/24, 176/20, 176/55, 60/73
[51] Int. Cl. .................................... G21c 7/36
[50] Field of Search .................. 176/20, 24, 25, 55, 56; 60/73

[56] References Cited
UNITED STATES PATENTS
3,042,600  7/1962  Brooks .................... 176/20
3,061,533  10/1962  Shannon et al. .......... 176/56
3,097,489  7/1963  Eggenberger et al. ..... 60/73

Primary Examiner—Reuben Epstein
Attorneys—F. H. Henson, R. G. Brodahl and E. F. Possessky ABSTRACT: A turbine follow control system for a boiling water reactor-steam turbine plant includes an electrical reference system which determines the reactor operating level through a reactor control system. The turbine follow control system operates turbine steam valves and steam bypass valves electrohydraulically to control the stem throttle pressure as the level of reactor operation is controllably varied to produce required steam flow. In another arrangement, a coordinated control system for a boiling water reactor-steam turbine plant includes an electrical reference system which simultaneously determines the reactor operating level and the turbine steam flow subject to throttle pressure control constraints.

FIG. I

SYSTEM AND METHOD FOR OPERATING A BOILING WATER REACTOR-STEAM TURBINE PLANT

CROSS-REFERENCE TO RELATED APPLICATIONS

Ser. No. 779,091 entitled "Improved Method and Feedforward System for Operating a Boiling Water Reactor-Steam Turbine Plant" filed by T. C. Giras and L. B. Podolsky on Nov. 26, 1968 and assigned to the present assignee.

BACKGROUND OF THE INVENTION

The present invention relates to steam turbine plants and more particularly to electric powerplants operated by steam turbines for which the steam supply is provided by a nuclear boiling water reactor.

In a boiling water nuclear reactor, the nuclear fuel is structured with a suitable geometry to provide for a sustained chain nuclear reaction as the coolant water passes through the fuel arrangement. Conventionally, the nuclear fuel is housed in elongated metallic tubes which are in turn assembled and supported in parallel arrays or bundles. The reactor core is formed from an assembly of the fuel bundles and it is housed in a large pressure vessel with provision for coolant flow along all of the fuel elements. Neutron absorbing control rods are supported within the core for movement relative to the fuel elements.

The design of the core and other reactor parameters determine the reactor power rating. Mechanical, nuclear, hydraulic and other details of the reactor design are the result of development programs aimed at achieving efficient performance for the plant owner.

Since water density is a large determinant of the rate of generation of slow neutrons which are required for the controlled propagation of the chain nuclear reaction, the power operating level of the reactor is partly determined by the accumulation of steam voids in the core volume. Increased coolant flow causes faster fuel rod cooling with reduced boiling and accordingly reduced void accumulation and higher reactor power. Decreased coolant flow has the opposite effects. Typically, coolant flow control can be used to control the boiling water reactor power level within a range of about 20 percent or 25 percent with preset control rod placement.

The reactor generated steam is normally directed through separators and dryers within the pressure vessel, and the dry saturated steam is directly channeled at a pressure such as 1,000 p.s.i. and a temperature such as 545° F. to the utilization equipment, i.e., the turbine generator unit(s) of the electric powerplant. Separated water is combined in the pressure vessel with external and internal recirculation flows and with return and makeup feedwater flow.

Since the boiling water reactor plant is the direct cycle type and since outlet steam pressure and reactor vessel pressure affect the void accumulation in the reactor core, it is desirable to operate the turbine inlet valves to determine the turbine and generator load level subject to pressure-regulating demands of the reactor. With reactor pressure maintenance within a relatively narrow pressure band such as about 30 p.s.i., reactor power level is controlled by coolant flow control within a limited range or by control rod movement if a different power range is required to meet load demand on the turbine generator unit(s).

In general, the steam turbine energization level is determined by the flow of the turbine inlet steam which in turn is determined by the steam conditions at the outlet of the steam source and by steam inlet valve positioning. The turbine drive power supplied for the plant generator(s) is desirably controlled to satisfy electrical load demand and frequency participation demand placed on the electric powerplant by the plant operator or by an economic dispatch computer or by other means.

At substantially constant temperature throttle steam, turbine power is proportional to turbine steam flow, and if the throttle pressure is also substantially constant the steam flow is proportional to the impulse chamber steam pressure or the ratio of the impulse chamber steam pressure to the throttle steam pressure. As already indicated, positioning of the inlet steam valving must provide for reactor vessel pressure regulation as well as turbine energization level control. When the boiling water reactor power level corresponds to the plant load demand, the turbine inlet valves are positioned to produce both the desired reactor vessel pressure and the turbine steam flow required for satisfying plant electrical load demand.

A steam bypass system is also usually provided to direct steam flow from the reactor outlet to the plant condenser under certain conditions. Steam bypass in effect provides an interface between the boiling water reactor and the steam turbine during reactor startup and shutdown and during other periods such as during load rejection. In these cases, steam supplied by the reactor but not needed by the turbine is channeled to the condenser under control imposed on the bypass system by the throttle pressure control system.

To control a boiling water reactor-steam turbine plant, it has been customary to use the turbine follow mode of operation. After plant startup, corrective changes are made in the reactor power level by automatic or manual reactor coolant flow control or by manual or possibly automatic control rod operation in order to satisfy plant load demand. Turbine throttle pressure is sensed and the turbine inlet steam valves are operated in the follow mode to control the throttle and reactor vessel pressures and enable turbine steam flow changes to be made to correct the turbine load as the reactor power level is being corrected. To speed up the control particularly when step changes are made in load demand, the setpoint of the turbine pressure control may be temporarily adjusted in response to the load error.

In the typical boiling water reactor-steam turbine application, the part of the control system directed to turbine valve control is principally mechanical and hydraulic in character with some electrical circuitry such as that involved in the throttle pressure sensing function. Examples of principally hydraulic turbine inlet valve feedback controls in nonnuclear applications are set forth in U.S. Pats. to Bryant, No. 2,552,401 and Marsland, No. 1,777,470. A principally mechanical turbine inlet valve feedback control is shown in U.S. Pat. to Eggenberger, No. 3,027,137 in a nonnuclear application. Electrohydraulic analog feedback-type turbine inlet valve controls have been employed in nonnuclear turbine applications to achieve operational improvements, and examples of such controls are presented in U.S. Pats. to Bryant, No. 2,262,560, Herwald, No. 2,512,154, Eggenberger, Nos. 3,097,488; 3,097,489; 3,098,176 and Callan, No. 3,097,490.

One shortcoming of the nuclear turbine prior art has been an inability to provide backup speed control uniformly without dependence on turbine operating load level. At a low load level, the turbine might typically be subjected to backup speed control in addition to pressure control at 105 percent of synchronous speed while at a higher load level the turbine might be subjected to backup speed control at a lower speed such as 101 percent of synchronous speed. It is generally desirable for plant safety and system security reasons to provide a substantially fixed turbine speed valve at which inlet steam pressure control is supplemented by backup speed control, and prior art systems have not had this capability principally because fluid pressure control of the backup speed control is auctioneered with that of the pressure control and thus the speed error required for implementation of speed control is dependent on the load level.

More generally, although prior art boiling water reactor-steam turbine plant operation has been more or less satisfactory, it has been characterized with performance deficiencies including deficiencies in system response speed and the extent of plant or system coordination. In turn, prior art plant operation has been less secure, less economic and less efficient than it might otherwise be. Thus, the turbine follow control scheme produces time delay in system load-generating performance since the boiling water reactor control must first change the reactor power level and incur the reactor response time before the turbine control valves are moved by the pressure control to correct a plant load demand error. As reactor power changes toward the demand power level, the reactor vessel and throttle pressure conditions change to allow the pressure control to move the turbine control valves and change the turbine steam flow toward the correct value.

Some reduction in the turbine follow delay and some improvement in plant coordination has been achieved by anticipatory operation of the throttle pressure control, i.e., the throttle pressure setpoint is adjusted at the same time that the reactor load level is adjusted to correct a load demand error so that the turbine control valves begin moving sooner in response to the throttle pressure control setpoint adjustment. In this manner, energy stored in the reactor steam is used within preset constraints on throttle pressure to obtain faster system response. As reactor power changes to correct the load demand error, the pressure control setpoint adjustment is withdrawn. Thus, the throttle pressure setpoint adjustment technique is anticipatory in the sense that it is employed to speed up the process response with the expectation that utilized stored system energy will be replaced by control imposed on the boiling water reactor.

Although throttle pressure setpoint adjustment has some merit from an anticipatory control standpoint as already indicated, it is deficient in that it still incurs the control system response delay of a conventional throttle pressure control. Further, throttle pressure setpoint adjustment involves a fixed characterization of the amount of throttle pressure setpoint adjustment to be provided as a function of time and load error. This relative inflexibility in throttle pressure setpoint adjustment in the throttle pressure control limits the turbine control valve operation to relatively gross anticipatory operation without specific calibration for best or nearly best system response over varying load demand, throttle pressure and other system conditions. Plant coordination and load response have accordingly been adversely affected.

Another general shortcoming of the turbine follow scheme of plant operation has been the fact that loss of throttle pressure control requires detection and some form of control action which either places the turbine under manual control or under another form of automatic control. The time lost in making the changeover includes the detection and initiation time as well as the time required to update the new control loops to present plant conditions. A deficiency thus occurs in plant coordination and it is desirable that it be avoided even if the control action time involved is relatively small.

SUMMARY OF THE INVENTION

In accordance with the broad principles of the invention, a system and method for operating a boiling water reactor-steam turbine plant involve a reactor control system and turbine valve and bypass valve electrohydraulic control systems which are operated to satisfy electrical references for plant load and turbine speed. In a turbine follow control scheme, the turbine and bypass valves are operated by a throttle pressure control to satisfy throttle pressure constraints as load demand is being met with changed reactor power level. A backup speed control electrically supplements the pressure control of the turbine control valves independently of turbine load level when the turbine speed reaches a predetermined value.

In a coordinated control scheme, extended system coordination and faster system response is achieved since both the turbine valve control and the reactor control systems are made dependent on the load reference. Pressure control means are provided for limiting the turbine valve control system operation to satisfy throttle pressure constraints as changes in load demand are met.

The pressure control means preferably is operative in response to a feedback ratio of the turbine impulse chamber steam pressure to the throttle steam pressure in order to negate positive feedback action otherwise imposed on the turbine control valves when impulse chamber steam pressure is used alone as the feedback variable. To hold the throttle pressure within a predetermined range of allowable values, the pressure control means further preferably is operative in response to throttle pressure error. The pressure control means also determines the operation of the bypass valve system in order to divert steam in excess of turbine needs directly to the plant condenser.

The invention is practiced with the electrical portions of the control systems embodied as analog control circuitry or digital control circuitry or as some combination of analog and digital control circuitry. When digital hardware is employed, a programmed digital process computer can be included in the control circuitry.

It is therefore an object of the invention to provide a novel system and method for operating a nuclear boiling water reactor-steam turbine powerplant with improved efficiency and economy.

It is another object of the invention to provide a novel system and method for operating a nuclear boiling water reactor-steam turbine powerplant with improved backup speed control.

A further object of the invention is to provide a novel system and method for operating a nuclear boiling water reactor-steam turbine powerplant with improved coordination.

An additional object of the invention is to provide a novel system and method for operating a nuclear boiling water reactor-steam turbine power plant with faster system response.

These and other objects of the invention will become more apparent upon consideration of the following detailed description along with the attached drawings.

DESCRIPTION OF THE PREFERRED EMBODIMENT

Figure 1:
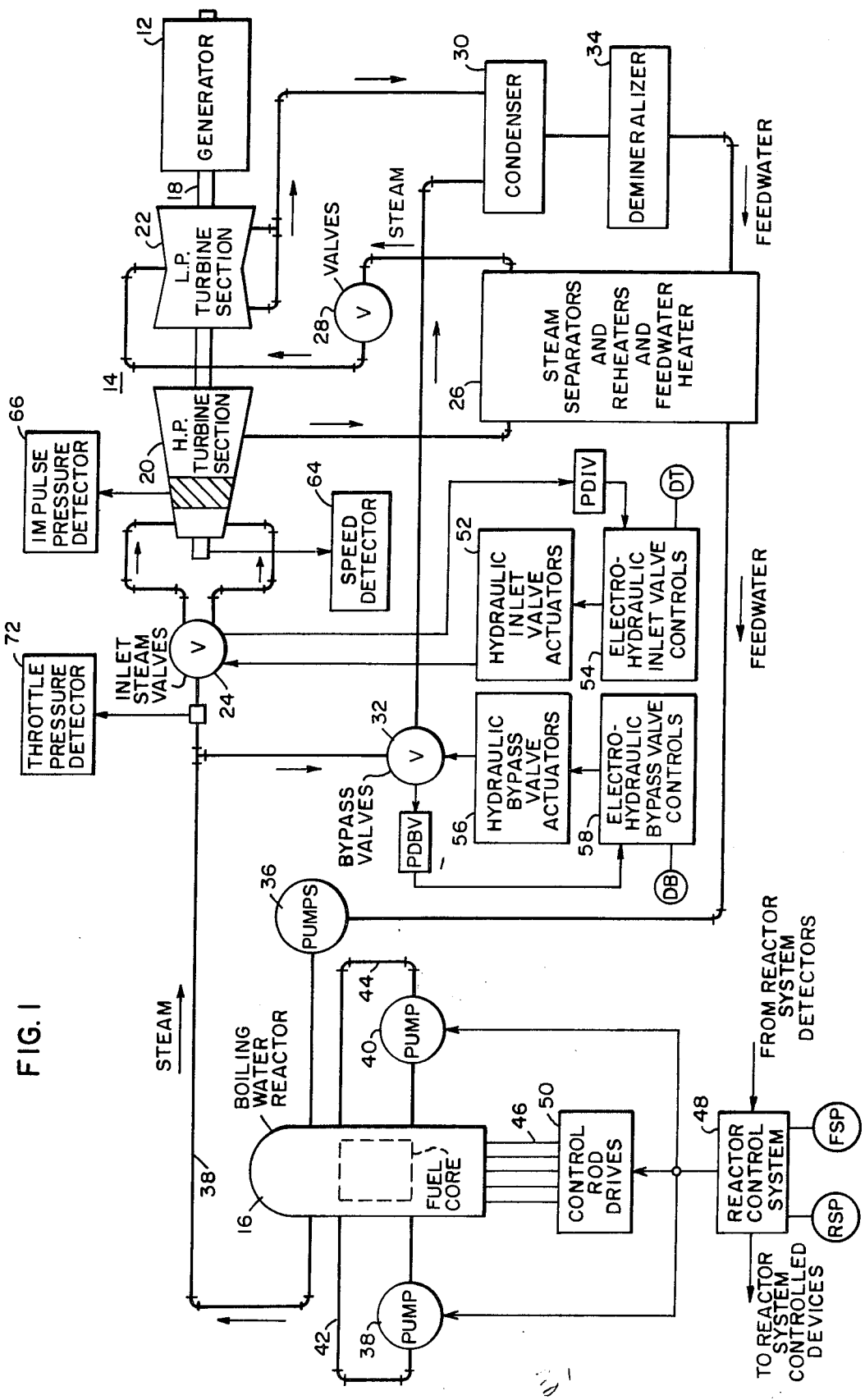
FIG. 1 shows a schematic diagram of an electric powerplant operated by boiling water reactor and steam turbine apparatus.

More specifically, there is shown in FIG. 1 an electric powerplant 10 which is provided with a conventional electric generator 12 operated by a nuclear steam turbine 14 in accordance with the principles of the invention. A steam-generating system for the turbine 14 includes a conventional nuclear boiling water reactor 16.

The nuclear steam turbine 14 is provided with a single-output shaft 18 which drives the generator 12 to produce three-phase or other phase electric power. Typically, the electric generator 12 is connected (not shown) through line breakers to a large electric power network and when so connected causes the turbogenerator arrangement to operate at synchronous speed under steady-state conditions. Under transient electric load change conditions, system frequency may be affected and conforming turbogenerator speed changes would result. At synchronism, power contribution of the generator 12 to the network is normally determined by the turbine steam flow and the throttle pressure at which that flow is supplied by the boiling water reactor 16.

In this instance, the nuclear steam turbine 14 is of the multistage axial flow type and includes a high-pressure section 20 and a double-flow, low-pressure section 22. Each of the turbine sections 20 and 22 may include a plurality of expansion stages provided by stationary vanes and an interacting bladed rotor connected to the shaft 18. In other applications, nuclear steam turbines operated in accordance with the present invention can have other forms with more or fewer sections tandemly connected to one shaft or compoundly coupled to more than one shaft. For example, as many as three or more low-pressure sections might be employed, and each section could have a single flow path or double or other plural flow paths.

Steam is directed to the nuclear turbine 14 through conventional inlet steam valves 24. Typically, the valves 24 would include two or more throttle valves (not specifically indicated) which admit steam to the turbine steam chest (not indicated) and a plurality of up to four or more governor control valves (not specifically indicated) which are arranged to supply steam to turbine inlets arcuately spaced about the turbine high-pressure casing.

The conventional nuclear turbine startup method is employed. Thus, the turbine speed is raised from the turning gear speed of about 2 r.p.m. to the synchronous speed under throttle or governor valve control. Then the power system breaker(s) is closed and the governor valves are operated to meet the load demand. On shutdown, similar but reverse practices can be employed or conventional coastdown procedure can be used. In the load control mode, plant electrical load demand is met when the steam flow and throttle pressure conditions cause the turbine energization level to correspond to the plant electrical demand.

The total turbine energization is produced by steam flow through the high-pressure section 20 and by steam flow through the low-pressure section 22. Steam flow between the two turbine sections is directed through steam separators and reheaters as indicated by block 26 in order to raise the steam enthalpy level to a more efficient value. Stop valve(s) are included in the steam flow path between the turbine sections to stop steam flow when necessary for turbine overspeed protection.

Vitiated steam from the low-pressure turbine section 22 is directed to a condenser 30. Reactor feedwater flow from the condenser 30 includes any makeup water flow and the flow resulting from condensation of the vitiated turbine steam as well as that resulting from condensation of the steam which is controllably diverted from the turbine 14 through bypass valves 32 directly to the condenser 30. The feedwater flow is directed from the condenser 30 to a demineralizer 34 where corrosion products and other impurities are removed from the fluid. From the demineralizer 34, the feedwater is driven by one or more feedwater pumps 36 through a feedwater heater system indicated in the block 26 and into the pressure vessel of the nuclear boiling water reactor 16.

In the reactor 16, heat produced in the fuel rods contained within the fuel core is transferred to the coolant which flows along the rods. Steam is collected at the top of the pressure vessel and directed through one or more conduits to the turbine inlet valves 24 as indicated by the reference character 38. Since the steam produced by the reactor 16 is used directly for turbine energization, the plant operation is characterized as being of the single or direct cycle type.

Generally, it is necessary to hold the reactor vessel pressure within a relatively narrow range because the vessel pressure affects the reactivity rate and the reactor power operating level, i.e., the power level varies directly with the reactor pressure. Accordingly, it is necessary that the turbine throttle pressure be held within a relatively narrow range by the imposition of throttle pressure control on the turbine inlet valve operation. Since turbine load is proportional to turbine steam flow or the ratio of impulse chamber pressure to throttle pressure (with the throttle steam at substantially constant pressure and temperature), turbine inlet valve control cannot satisfy load demand changes in the steady state unless changes are made in the steam generation rate at the steam source.

To enable turbine steam flow changes to be made to satisfy turbine and plant loading demand within the throttle pressure operating range, the reactor power operating level is changed as by changing the reactor core recirculation flow through controlled operation of centrifugal pumps 38 and 40 in recirculation flow loops 42 and 44. Jet pumps (not shown) can be used within the reactor vessel to produce a drive flow which forces coolant recirculation through and about the fuel core.

When it is desired to increase reactor power, steam void accumulation is reduced by increasing recirculation flow. Reduced reactor power requires reduced recirculation flow. Typically, recirculation flow control can be used to vary reactor power over a range as high as 25 percent or more.

Larger power changes require position changes in conventional control rods 46 to vary the amount of neutron absorption. Manual or possibly automatic control rod placement would normally also be subject to implementation of a core burnup management program.

A conventional reactor control system designated by block 48 is provided for determining the operation of the recirculation flow system and the operation of the control rods 46. Feedback signals or data are applied to the reactor control system 48 from predetermined reactor system detectors and manually or automatically operated analog controllers or other suitable control means in the reactor control system 48 generate outputs which operate the recirculation flow pumps 38 and 40, drives 50 for the control rods 46 and other reactor system control devices.

In the recirculation flow control system, conventional coolant flow detectors (not shown) can be used to determine the flows in the loops 42 and 44 for feedback comparison to an externally determined recirculation flow setpoint FSP. Similarly, suitable position detectors generate control rod position feedback signals for comparison with control rod position setpoints RSP which are determined in accordance with the externally determined core management program and, if desired, in accordance with any demand for reactor power change in excess of the recirculation flow control range. In this case, automatically operated pump controllers vary the speed of the recirculation pump drives for flow correction and manually operated rod drive controllers are used to operate the rod drives to satisfy the rod position setpoints RSP.

Inlet steam turbine valves positioning is effected by operation of respective conventional hydraulic inlet valve actuators 52 under the control of respective electrohydraulic controls 54. A total inlet valve position demand signal DT is applied to the controls 54 where individual inlet valve demand signals $DTl,...,DTn$ are conventionally generated from the total signal DT for comparison to respective inlet valve position feedback signals conventionally generated by respective linear differential transformer or other position detectors PDIV. Position error for any of the inlet valves 24 results in operation of the associated valve actuator 52 until the error is removed and the total valve position demand DT is satisfied.

Similarly, hydraulic bypass valve actuators 56 and electrohydraulic bypass valve controls 58 operate the bypass valves 32 to satisfy a total bypass valve position demand signal DB for diversion of steam not needed by the turbine 14 such as during startup and shutdown and during load control when load rejection conditions are imposed on the power plant 10. Bypass valve position feedback signals are generated by conventional position detectors PDBV for comparison to individual bypass valve position demand signals $DBl,...,DBn$ derived from the total bypass demand DB.

Each valve control system in the electrohydraulic controls 54 and 58 includes a conventional electrical analog demand controller (not indicated) which linearly characterizes the individual valve position demand signal applied to its input. The demand controller output is coupled to a conventional analog position controller (not indicated) where a valve position error signal is generated by combination of the demand controller output and the valve position feedback signal. The position controller provides proportional plus reset action. Its output operates a servo valve which in turn operates the hydraulic valve actuator 56 until the correct valve position is obtained. For greater detail on the conventional aspects of electrohydraulic controls, reference is made to a paper entitled "Electrohydraulic Control For Improved Availability and Operation of Large Steam Turbines" and presented by M.

Birnbaum and E. G. Noyes to the ASME-IEEE National Power Conference at Albany, New York during Sept. 19-23, 1965.

Figure 2:
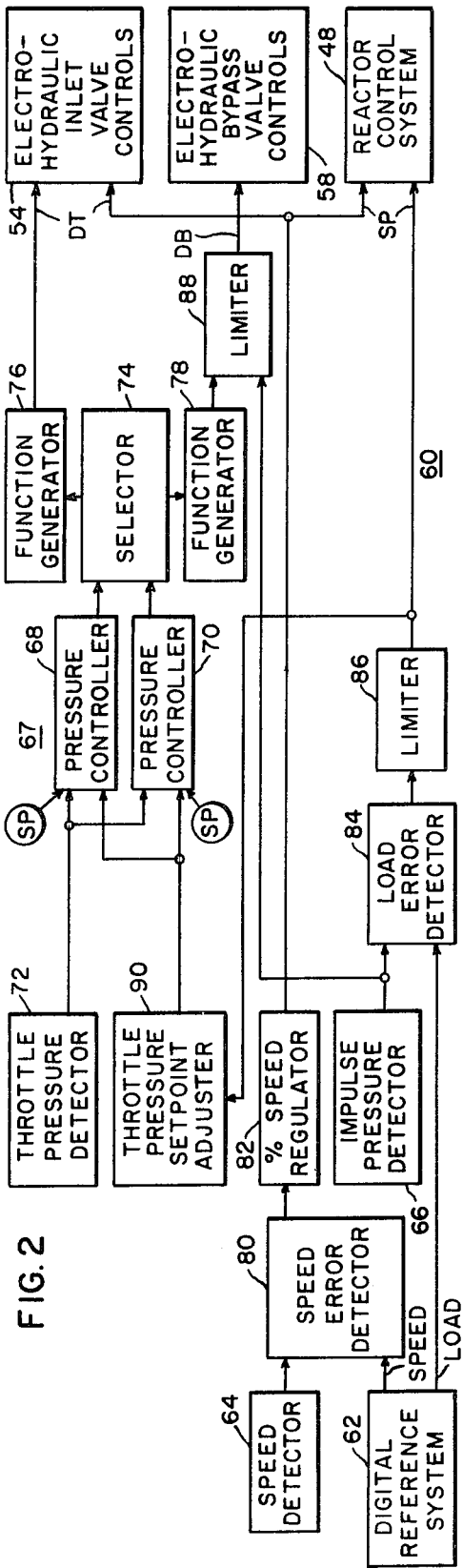
FIG. 2 shows a schematic diagram of a turbine follow control system arranged in accordance with the principles of the invention to operate the plant of FIG. 1.

A turbine follow control system 60 is employed as shown in FIG. 2 to operate the boiling water reactor 16 and the steam turbine 14 and provide improved operation of the plant 10. A conventional digital reference system 62 like that discussed in the aforementioned Birnbaum and Noyes paper is employed to generate an electrical speed reference and an electrical load reference to which the plant operation is to be conformed as determinable respectively from the electrical outputs of a conventional speed detector 64 coupled to the turbine shaft structure and a conventional impulse pressure detector 66 coupled to the impulse chamber of the high-pressure turbine section 20.

As plant operation is being controlled to meet plant demand, throttle pressure is held below a limit value and/or within a predetermined range of values through the operation of a conventional analog pressure controller 68 or a similar backup pressure controller 70 in a throttle pressure control system 67. Throttle pressure is detected by a conventional throttle pressure detector 72 which generates an electrical output for summing with a suitably generated setpoint signal SP.

The pressure controller 68 or 70 can be a conventional operational amplifier having input circuitry which performs the summing function with respect to the applied input signals. In this instance, the pressure controller 68 or 70 is provided with a proportional characterization like that provided for pressure controllers in conventional turbine follow control systems for boiling water reactor-steam turbine plants. However, in a manner similar to that described in the aforementioned Giras and Podolsky copending application, the throttle pressure control system 67 can make use of pressure controllers with other characterizations such as a proportional plus reset characterization.

A suitable comparator circuit in selector block 74 operates to transfer the output of one of the pressure controllers 68 or 70 for further processing. For example, under normal conditions, the backup controller 70 may be adjusted to generate a slightly larger output than the pressure controller 68 over the range of throttle pressure error inputs. The selector 74 then responds to the backup controller 70 only when its output is less than that of the controller 68.

Respective analog function generator circuits 76 and 78 operate on the selected pressure controller output signal to generate the respective valve position demand signals DT and DB for the turbine inlet valves 24 and the bypass valves 32. Preferably, the inlet valve function generator 76 produces an output valve position demand signal proportional to the pressure controller output with the constant of proportionality selected to produce a suitable closed loop gain for the inlet valve control loop.

Similarly, the bypass valve function generator 78 produces an output valve position demand signal proportional to the pressure controller output with the constant of proportionality selected to produce a suitable closed hoop gain for the bypass valve control loop However, the transfer function in the function generator 78 is such that no output begins to be generated for bypass valve control action until throttle pressure error exceeds a predetermined amount above rated throttle pressure.

The throttle pressure control system 67 accordingly maintains throttle pressure within range by turbine inlet valve control action thereby directly affecting turbine loading or by bypass valve control action thereby diverting unneeded steam from the turbine 14 to the condenser 30. Plant load demand is met in the load control mode of operation by the turbine 14 through follow action with reference to the boiling water reactor 16. Thus, changes in the operating level of the reactor in the load mode of operation enable the turbine load ultimately to be adjusted to meet plant demand as throttle and reactor pressure constraints are satisfied.

To reach the load mode of plant operation, the reactor 16 is started with the turbine 14 at turning gear speed, the function generator 76 turned off and the reactor and throttle pressure controlled by bypass valve operation. The function generator 78 is suitably controlled by the selector or block 74 to establish this operating mode. At an appropriate reactor operating level and at appropriate steam conditions, the turbine 14 is accelerated toward synchronous speed by the use of a speed ramp reference applied by the reference system 62 to a conventional speed error detector circuit 80 where it is compared with the actual speed signal. The resultant speed error signal is characterized with percent speed regulation as indicated by block 82 and then applied to the turbine inlet valve controls 54 where is forms the inlet valve position demand signal DT. The controls 54 then operate the actuators 52 to correct the positions of the inlet valves 24. In most instances, inlet valve sequencing is involved in inlet valve control and the controls 54 accordingly include conventional sequencing control circuitry. During speed control, the function generator 76 remains off and bypass system operation continues in order to control the throttle pressure.

After synchronization and closure of the plant breaker(s), the turbine 14 is initially loaded and throttle pressure control is transferred from the bypass valves to the turbine valves. Such transfer is suitably effected, as by operation of bumpless transfer circuitry included in the selector block 74 as the function generator 76 is turned on to generate the demand DT. After initial loading, the plant enters the load control mode of operation in which the turbine 14 is operated under throttle pressure control to follow corrective load changes made in the reactor operating level. In the turbine follow load control mode, the bypass valves 32 are closed to prevent bypass steam flow except in response to operation of the function generator 78. A computer control arrangement for sequencing the system through the various operating modes is described in the aforementioned Giras and Podolsky copending application.

During initial loading and during turbine follow operation, a conventional load error detector 84 compares the load reference signal with actual load represented by the output of the impulse pressure detector 66 and generates an error signal which is passed through a plant safety limiter 86 and applied to the reactor control system 48. If desired, the reactor load error signal can instead be developed with the use of a megawatt transducer (not shown). At that point, the load error is algebraically summed with any speed error or frequency participation signal to constitute the reactor load setpoint. Reactor operation is controlled by the control system 48 as previously described.

As the reactor 16 is controlled to meet frequency-adjusted load demand, the pressure controller 68 or 70 generates a turbine valve control signal which is proportional in magnitude to the magnitude of the throttle pressure error and which is operated upon by the function generator 76 to produce the signal DT. The gain applied by the turbine inlet valve controls 54 determines the rate at which the turbine steam flow changes without exceeding throttle pressure limits until the plant load demand is satisfied.

To speed up the turbine follow control action, a conventional throttle pressure setpoint adjuster 90 is provided with a transfer function having suitable dynamic characterization. It responds to the limited load error signal and temporarily changes the pressure controller setpoint SP particularly when step changes are made in the load demand.

During load control, the electrical speed error signal is applied to the inlet valve controls 54 but it produces no control until turbine speed exceeds a predetermined value such as 102 percent rated. The initiation of speed control is electrically determined such as by the use of diode logic circuitry (not shown) in the turbine inlet valve controls input circuitry to determine when the speed signal exceeds the assigned value. When the speed control loop becomes operative in the load control mode, the turbine valve position demand DT is made equal to the sum of the speed control signal and the pressure control signal. The speed feedback loop includes the speed error detector 80, the percent speed regulator 82 and the electrohydraulic inlet valve controls 54. Thus, during turbine overspeed, the speed control loop offsets pressure control operation to produce progressive inlet valve closure as turbine speed increases, and the initiation of the speed control is made at a particular turbine overspeed value independent of the turbine load level. Better plant operation is thus realized under turbine follow control and similar benefits can be realized in coordinated plant control. The impulse pressure detector output is combined with the output of the bypass valve function generator 78 in limiter block 88 in order to keep total reactor steam flow below a limited value.

Figure 3:
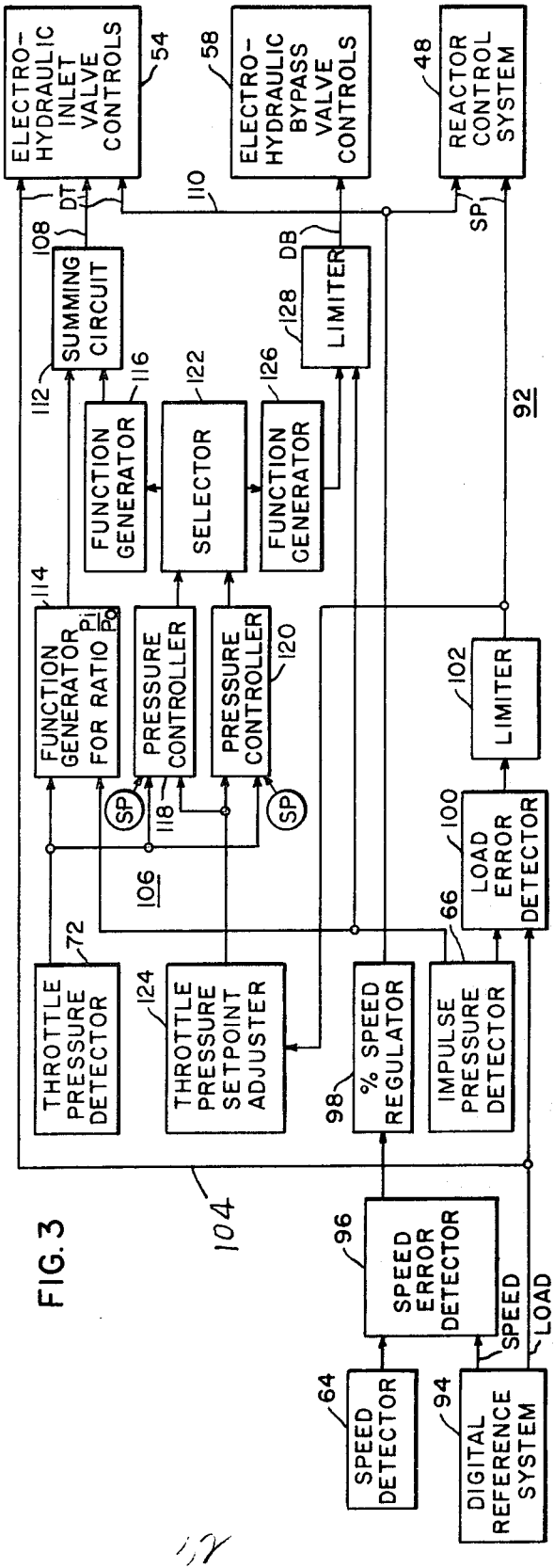
FIG. 3 shows a schematic diagram of a coordinated control system arranged in accordance with the principles of the invention to operate the plant of FIG. 1.

In FIG. 3, there is shown a coordinated control system 92 arranged in accordance with the principles of the invention to provide for improved boiling water reactor-steam turbine plant operation. The control system 92 includes components similar to those employed in the control system 60 of FIG. 2 but some component differences and different interaction provide for the improved operation.

A conventional digital reference system 94 is again employed to generate an electrical load reference and an electrical speed reference. The speed control channel in this case also includes a speed error detector 96 which generates a speed error signal signifying the difference between the speed reference signal and the output signal of the speed detector 64 which represents the actual turbine speed. The speed error signal is characterized with a percent regulation in block 98 and applied to the reactor control system 48 and the electrohydraulic inlet valve controls 54 as in the case of FIG. 2. The feedback speed control loop controls turbine acceleration during startup, frequency participation during the load mode of operation, and turbine deceleration during shutdown in those cases where turbine coastdown is not employed.

During load control, a conventional load error detector 100 generates a signal representative of load error in response to the difference between the load reference signal and the output signal of the impulse pressure detector 66 which represents the actual turbine load. After limiting in block 102, the load error signal is applied to the reactor control system 48 to keep the reactor power level in line with plant load demand. As previously, the reactor load error signal can if desired be developed with the use of a megawatt transducer.

In order to produce faster, more coordinated, more efficient and economic and more reliable plant operation during the load control mode, the coordinated control 92 also includes a load control loop partly indicated by the reference character 104 in which a load demand, preferably in the form of the load reference signal, is applied directly to the electrohydraulic inlet controls 54 subject to the constraint produced by a throttle pressure control system 106. In alternate cases, the load demand signal could be the load error signal from the detector 100.

As changes are made in the load reference or as changes occur in the turbine load at a fixed load reference, the total inlet valve position demand DT is directly varied to achieve immediate inlet valve position change subject to the constraint imposed by the throttle pressure control system 106. The valve position demand DT under normal load operation is generated by suitable circuitry within the block 54 as the algebraic sum of the load reference signal, speed control signal 110 and a throttle pressure control signal 108. The throttle pressure constraint is thus imposed through variation of the total valve position demand signal DT. The control signal 110 is continuously included in the sum DT, but, if desired, inclusion of the speed control signal 110 can be blocked (such as by diode circuitry) from the sum DT under turbine overspeed conditions until the turbine reaches a particular overspeed value. Imposition of speed control then offsets load control to produce progressive turbine inlet valve closure as turbine speed increases. As previously, the initiation of speed control on overspeed then is made independently of the load operating level. In both FIGS. 3 and 4, the speed regulation determines the turbine overspeed value at which full inlet valve closure occurs.

For frequency participation required by increased loading, the speed control is similarly continuously applied to the inlet valves, but it may be applied only after a predetermined speed drop has been sensed by diode circuitry (not shown) or other suitable means in the input circuitry of the inlet valve controls 54. The turbine is then prevented from being operated for minor frequency participation demands.

On the subject of load control again, direct load control of the inlet valve controls 54 essentially involves making use of stored energy in the reactor steam to achieve faster load control as the reactor power level is being changed to correct load demand error. In this sense, the coordinated control system 92 is similar to the turbine follow control 60 of FIG. 2 since the latter uses throttle pressure setpoint adjustment to make use of stored steam energy for faster plant response. However, direct load control in the coordinated control system 92 produces faster and generally better plant performance because turbine valve movement is initiated without the time delay of pressure control system response and further because the early valve movement can always be made with the best calibration, i.e., to the extent allowed by the throttle pressure system control constraint. In contrast, use of throttle pressure setpoint adjustment in turbine follow systems involves a fixed precharacterization of turbine valve control response without calibration of all of the varying process conditions.

The total inlet valve position demand signal DT results from balancing the load reference signal and, as applicable, the speed control signal against the signal 108 from the throttle pressure control system 106. The valve position feedback signals PDIV are compared to the individual valve position demand signals DT$l$,...,DT$n$ as in FIG. 2 until valve position error is removed by proportional plus reset control action. The pressure control signal component 108 of the valve position demand signal DT in effect modifies the load reference signal to direct the inlet valve positioning to satisfy load demand as well as throttle pressure constraints.

In applying load demand directly to the turbine inlet valve controls 54, a positive feedback condition can tend to be created unless otherwise prevented. For example, increased load demand requires higher steam flow and higher impulse pressure. Opening movement of the governor valves is thus required, but this causes the throttle pressure to drop which in turn causes lower impulse pressure and a need for further opening movement of the governor valves.

The throttle pressure control system 106 allows inlet valve action to be directed to meeting load demand within throttle pressure constraints and in doing so avoids the development of positive inlet valve feedback action. Thus, the pressure control signal 108 is generated by a conventional summing circuit 112 as the algebraic sum of respective signals from a pressure function generator 114 and a pressure error function generator 116.

As in the case of FIG. 2, the throttle pressure signal is coupled from the throttle pressure detector 72 to the input of a pressure controller 118 and a backup pressure controller 120. A setpoint SP is compared to the signal representing actual throttle pressure and a throttle pressure error signal is developed. In this instance, proportional action is employed in the pressure controller 118 or 120. A selector 122 transfers the output throttle pressure error signal from one of the pressure controllers 118 or 120 to the input of the function generator 116 by the selection procedure previously described. The transfer function for the generator 116 is like that described for the function generator 76 of FIG. 2.

The inputs to the ratio function generator 114 are the output signal from the throttle pressure detector 72 and the output signal from the impulse pressure detector 66. The output signal from the generator 114 is a predetermined function of the ratio of the impulse pressure $P_i$ to the throttle pressure $P_o$. Preferably, the transfer function is selected to make the output signal from the generator 114 substantially constant when the turbine is held at constant load, i.e., constant $P_t$. This feature enables throttle pressure control actions to be applied to the controls 54 when there is no load error. Suitable circuitry (not shown) is employed in the generator 114, for example, a conventional potentiometer circuit can be used to generate the ratio signal and a conventional logic-gating circuit can be used to block or pass the ratio signal in accordance with the transfer function.

The ratio of $P_t$ to $P_o$ is proportional to total inlet valve area which in turn is substantially linear with load at rated throttle pressure. Thus, the ratio of $P_t$ to $P_o$ acts as a load feedback which is balanced against the load reference signal in forming the total demand signal DT. The ratio feedback eliminates positive feedback action since a valve position change made to satisfy a change in $P_t$ demand causes an opposite polarity change in the ratio. The throttle pressure control channel including the controller 118 or 120 and the function generator 116 applies throttle pressure constraint action as load demand is satisfied through the ratio feedback control.

If desired, the summing circuit 112 can be combined in the block 54. In that event, the total valve position demand signal DT during load control equals the algebraic sum of the load reference signal, the pressure ratio load feedback signal, the throttle pressure constraint signal from the function generator 116, and, as applicable, the speed control signal 110.

A throttle pressure setpoint adjuster 124 is also employed in the coordinate control system 92. The adjuster 124 responds to the limited load error signal to lower or raise the pressure controller setpoint SP within limits to prevent closing or opening of the turbine inlet valves respectively on increases or decreases in load demand. If throttle pressure falls below or rises above the adjusted setpoint, the control system causes the turbine inlet valves to close or open as the case may be.

The pressure control system 106 also includes a bypass valve function generator 126 which provides a bypass valve control signal in the manner described for FIG. 2 so that steam not needed by the turbine 14 during load control is diverted directly to the condenser 30. The total bypass valve demand signal DB is derived from the bypass control signal subject to and impulse pressure limited by a limiter 128.

Improved boiling water reactor-steam turbine plant operation results from use of the invention. The improvement includes better performance with greater economy, efficiency and reliability. The coordinated control provides faster and more coordinated plant operation within plant performance capabilities. The improved coordination includes improvement in the relative operating dynamics of the boiling water reactor and the steam turbine as well as other improvements such as an inherent capability for immediate load control of the turbine valves in the event of loss of pressure control.

Electrohydraulic controls are used in both the turbine follow and coordinated control modes of plant operation. The electrical parts of the systems are herein described in analog terms, but digital systems including digital computers can be employed to effect the disclosed system functioning. Further, either analog or digital control systems can employ hardware and/or software control circuitry which differs in detail from that described herein particularly insofar as the coordinated control system is concerned. For example, computer control can be used to effect turbine valve positioning in a manner like that described in a paper entitled "Digital Control For Large Steam Turbine-Generators" and presented by T. C. Giras and M. Birnbaum to the American Power Conference in Chicago, Illinois on Apr. 23-25, 1968. Feedforward and computer control can be employed for boiling water reactor-steam turbine plant operation in the manner disclosed in the aforementioned Giras and Podolsky application. In digital computer control, many control functions embraced by the invention are performed by software control circuitry (i.e., software execution) as opposed to analog control circuitry (i.e., hardware operation).

The foregoing description has been presented only to illustrate the principles of the invention. Accordingly, it is desired that the invention not be limited by the embodiment described but rather that it be accorded an interpretation consistent with the scope and spirit of its broad principles.

What is claimed is:

1. A system for controlling the operation of a nuclear boiling water reactor-steam turbine plant, said system comprising means for generating an electrical representation of a load demand reference and an electrical representation of a turbine speed demand reference, means for generating an electrical representation of actual turbine speed, means responsive to the load reference representation for controlling the operation of the reactor to meet load demand, means for generating an electrical representation of the throttle pressure of steam supplied to the turbine by the reactor, an electrohydraulic control system for operating steam inlet valves associated with the turbine, an electrohydraulic control system for operating steam bypass valves to divert steam from the turbine to a condenser under predetermined throttle pressure conditions, means responsive to the throttle pressure electrical representation for operating said inlet valve control system to constrain the throttle pressure within predetermined limits, means for generating an electrical representation of turbine speed error from the speed reference and actual speed representations, and means for operating said inlet valve control system in response to the speed error representation at a predetermined turbine overspeed independent of turbine load.

2. A plant control system as set forth in claim 1 wherein said system operates in the turbine follow mode and a throttle pressure control system includes the first-mentioned inlet valve control system operating means and primarily determines the operation of said inlet valve control system.

3. A plant control system as set forth in claim 2 wherein said electrohydraulic control systems include electrical control circuitry formed principally from analog circuits.

4. A plant control system as set forth in claim 1 wherein said system operates in a coordination control mode, and a throttle pressure control system includes the first-mentioned inlet valve control system operating means to produce throttle pressure constraint on the operation of said inlet valve control system, and means responsive to the load reference representation is provided for directly controlling the operation of said inlet valve control system to produce load corrective positioning of the turbine inlet valves within throttle pressure constraints.

5. A system for controlling the operation of a nuclear boiling water reactor-steam turbine plant, said system comprising means for generating an electrical representation of a load demand reference, means responsive to the load reference representation for controlling the operation of the reactor to meet load demand, an electrohydraulic control system for operating steam inlet valves associated with the turbine, an electrohydraulic control system for operating steam bypass valves to divert steam from the turbine to a condenser under predetermined throttle pressure conditions, means for generating an electrical representation of the throttle pressure of steam supplied to the turbine by the reactor, and means responsive to the load reference and throttle pressure electrical representations for controlling the operation of said inlet valve control system to adjust the turbine load toward plant demand within throttle pressure constraints and without positive feedback effect on impulse pressure as the reactor power level undergoes correction.

6. A plant control system as set forth in claim 5 wherein means are provided for generating an electrical representation of the ratio of the turbine impulse pressure to the throttle pressure, said controlling means for said inlet valve control system provides inlet valve operating control at least in response to the pressure ratio and load reference and throttle pressure electrical representations, and said controlling means for said inlet valve control system includes said ratio generating means.

7. A plant control system as set forth in claim 6 wherein means are provided for generating a representation of throttle pressure error in response to the throttle pressure electrical representation, and said controlling means for said inlet valve control system includes said throttle pressure error generating means.

8. A plant control system as set forth in claim 6 wherein said ratio generating means generates an electrical representation as a predetermined function of the ratio of the turbine impulse pressure to the throttle pressure, and the pressure ratio representation is substantially constant for constant turbine impulse pressure.

9. A plant control system as set forth in claim 8 wherein said controlling means for said inlet valve control system includes at least one analog pressure controller responsive to a throttle pressure setpoint and an actual throttle pressure signal to generate a throttle pressure error signal, said electrohydraulic inlet valve control system includes electrical circuitry formed principally from analog circuits, and means responsive at least to the throttle pressure error signal and the load demand electrical reference representation and the pressure ratio representation are provided to generate a valve position demand signal for said electrohydraulic inlet valve control system.

10. A plant control system as set forth in claim 5 wherein said reactor-controlling means includes means responsive to the load reference representation and an electrical representation of actual load to generate a load error representation upon which reactor control actions are based.

11. A method for controlling the operation of a nuclear boiling water reactor-steam turbine plant, the steps of said method comprising generating an electrical representation of a load demand reference, controlling the operation of the reactor to meet the load demand in accordance with the load reference representation, generating an electrical representation of the throttle pressure of steam supplied to the turbine by the reactor, controlling the operation of turbine steam inlet valves by means of an electrohydraulic control system, controlling the operation of steam bypass valves to divert steam from the turbine to a condenser under predetermined throttle pressure conditions by means of an electrohydraulic control system, and controlling the operation of the inlet valve electrohydraulic control system in response to the load reference representation and the throttle pressure electrical representation to adjust the turbine load toward plant demand within throttle pressure constraints and without positive feedback effect on impulse pressure as the reactor power level undergoes correction.

* * * * *